United States Patent [19]

Christenson et al.

[11] 4,148,618
[45] Apr. 10, 1979

[54] ASHTRAY

[75] Inventors: David N. Christenson, Stacy; Frank A. Freeman, Eagan; Joseph T. Foley, St. Paul, all of Minn.

[73] Assignee: Smoketray, Inc., Minneapolis, Minn.

[21] Appl. No.: 750,872

[22] Filed: Dec. 15, 1976

[51] Int. Cl.² .............................................. B01D 50/00
[52] U.S. Cl. .................................. 55/385 G; 55/387; 55/467; 131/203; 131/231
[58] Field of Search ................ 55/385 R, 385 G, 387, 55/467; 131/202, 203, 174, 231

[56] References Cited
U.S. PATENT DOCUMENTS

| 1,498,190 | 6/1924 | Morrier | 131/174 |
|---|---|---|---|
| 2,029,192 | 1/1936 | Ray | 55/385 G |
| 2,786,474 | 3/1957 | Garson | 131/240 GG |
| 3,099,270 | 7/1963 | Garson | 131/240 GG |
| 3,516,232 | 6/1970 | Gilbertson | 55/385 G |
| 3,765,427 | 10/1973 | Bell | 131/174 |
| 3,958,965 | 5/1976 | Raczkowski | 55/385 G |

Primary Examiner—Bernard Nozick
Attorney, Agent, or Firm—James R. Haller

[57] ABSTRACT

An ashtray having a top upon which lit cigarettes or the like may be rested and having a plurality of holes therethrough through which smoke from the cigarette may be drawn downwardly through odor-treating material. The holes in the top are such as to permit the smoke-entraining downward flow of air therethrough while yet substantially preventing the passage of cigarette ashes.

10 Claims, 6 Drawing Figures

ASHTRAY

BACKGROUND OF THE INVENTION

To non-smokers, the smell of cigarette smoke is at the least often unpleasant, and may in some instances be actually nauseating. The Surgeon General has determined that cigarette smoking is dangerous to one's health, and indeed it has been said that even long exposure to smoke-filled atmospheres desirably should be avoided. Much of the smoke emanating from a cigarette is generated while the cigarette is not actually being smoked, as when the cigarette is resting in an ashtray. If even the smoke generated by a cigarette resting in an ashtray could be kept from escaping into a room, the concentration of smoke in the room could be substantially reduced. A reduction in the smoke level in an office or other room, besides providing an obvious health benefit, would also render the room less offensive to a non-smoking visitor.

A variety of ashtrays have been proposed to reduce the amount of smoke escaping into the air from cigarettes or cigars resting in the ashtrays; exemplary of these are the ashtrays shown in U.S. Pat. Nos. 2,029,192; 2,788,085 and 3,797,205. None of these ashtrays, to the best of our knowledge, have become successful from a commercial standpoint, and one of the reasons for this may be that such ashtrays are rather difficult to clean, or may be bulky and cumbersome and thus not aesthetically pleasing, or may be noisy.

An ashtray which would capture the smoke from a cigarette resting thereon and treat the smoke so as to remove odors and other material therefrom, and which would additionally be easily cleaned, aesthetically pleasing and substantially silent, is greatly to be desired.

SUMMARY OF THE INVENTION

The present invention provides an ashtray of unique design and construction which is not only substantially silent in operation and efficient in the removal of cigarette smoke odors, but which is also pleasing to the eye and which is as easily cleaned as are most ashtrays of conventional design.

The ashtray of the invention includes a body having a generally downward opening therethrough, and blower means for establishing a downwardly directed airflow through the body opening. Odor-treating material, such as activated charcoal or the like, is supported in the opening in the path of the airflow. A metal top covers the body opening and is so configured as to permit the lit end of a cigarette to be rested thereon. The body includes a large plurality of small holes therethrough which are of a size and quantity to substantially prevent the passage of cigarette ashes through the top but to none-the-less permit sufficient downward airflow through the top to entrain smoke from the cigarette and to pass the smoke through the odor-treating material. Desirably, the top, blower, body and odor-treating material are so selected and arranged as to provide the minimum airflow through the body opening necessary to entrain smoke from a lit cigarette resting upon the top. Desirably, the top is a metal sheet having perforations etched or drilled therein, the perforations having diameters sufficiently small to prevent cigarette ashes from passing through them, but the perforations being of sufficient number and proximity to permit airflow through them at a rate sufficient to entrain smoke from a lit cigarette resting on the top. The perforations desirably represent 20% or 30% or more of the surface area of the top.

The blower means desirably is a small electric fan which is mounted in the body with the fan blades extending substantially across the body opening. The fan may be driven by electricity from an outlet, or by batteries. The odor-treating material, which may be particulate activated charcoal, may be disposed in one or more layers extending across the ashtray body opening, peferably above the location of the fan blades.

DESCRIPTION OF THE PREFERRED EMBODIMENT

Figure 1:
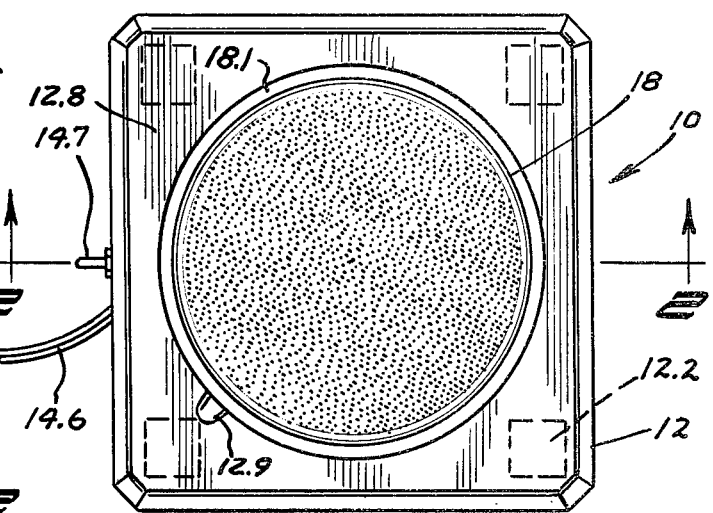
FIG. 1 is a plan view of an ashtray of the invention.
Figure 2:
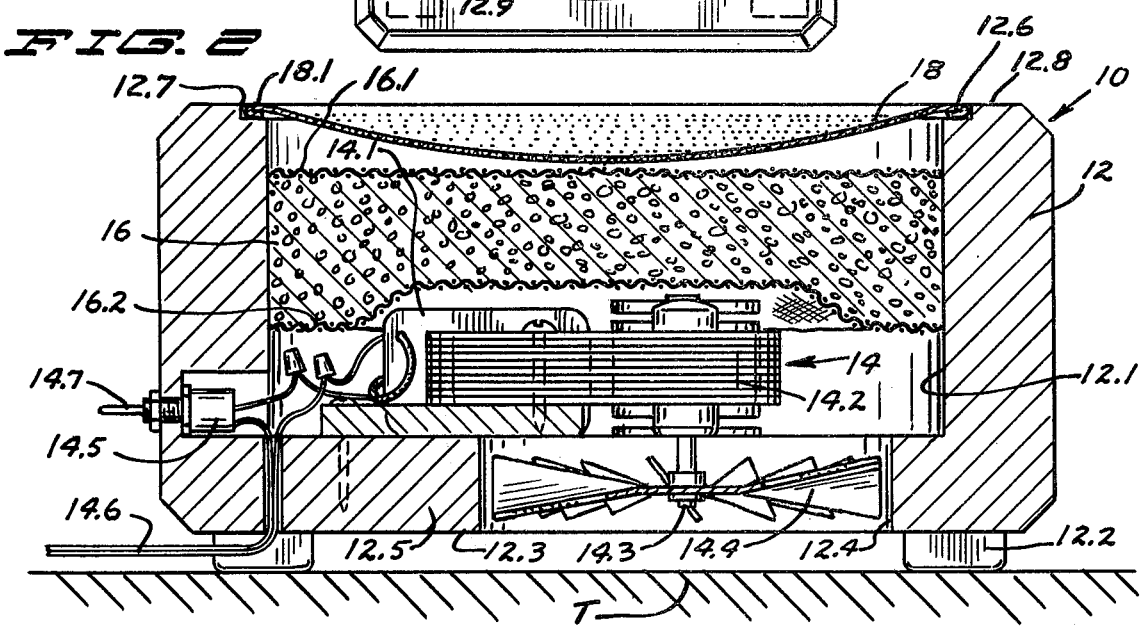
FIG. 2 is a crosssectional view taken along line 2—2 of FIG. 1.

Referring first to FIGS. 1 and 2, an ashtray of the invention is depicted generally as 10, and includes a generally parallelepiped body 12 which may be made of wood or plastic or other material and which has a generally vertical opening 12.1 therethrough of generally circular cross section. As will be explained, the opening 12.1 is provided with various diameters throughout its height. The body desirably is supported by a plurality of feet 12.2 at its corners so that the bottom surface 12.3 is spaced above the surface of a table top T upon which the feet rest by a distance of, for example, 5/16 inches. At the bottom of the body, the walls defining the opening 12.1 converge inwardly to form an offset opening 12.4 of somewhat lesser diameter, the lower body portion providing an inwardly projecting shelf 12.5.

A blower, such as a small electric fan designated generally as 14, is attached to a bracket 14.1 which in turn is mounted to the body shelf 12.5 by means of screws or the like. The fan 14 includes a motor 14.2 driving a drive shaft 14.3. Propeller-type fan blades 14.4 are mounted to the bottom end of the drive shaft, and extend radially outwardly therefrom into close proximity with the walls of the opening 12.4, all as shown best in FIG. 2. As shown in the drawing, the motor is electrically operated and is connected through an external switch 14.5 to an external power source through a cord 14.6. It will be understood that the fan may be battery operated as well, and in one embodiment preferably employs rechargeable batteries such as nickle-cadmium batteries of a type well known in the art. The switch 14.5 is desirably mounted in a side wall of the body as shown in FIG. 2, and includes an externally projecting toggle 14.7 of pleasing exterior appearance.

A layer 16 of odor-treating material, such as activated charcoal, is positioned immediately above the fan 14.2, and is held in place by upper and lower screens 16.1, 16.2. The screens support the odor-treating material, and prevent the same from escaping into the vicinity of the fan. The screens 16.1, 16.2 may have diameters very slightly greater than the inner diameter of the opening 12.2 so that the edges of the screens, which are normally somewhat sharp, are forced against the walls of the opening to hold the screens in place. If desired, the opening 12.1 may be provided with circumferential grooves into which the edges of the screen may be received.

The upper end of the opening 12.1 may be enlarged slightly to provide an upwardly facing shelf 12.6 to support a top 18 is substantially horizontal and covering the opening 12.1. The top 18 desirably is a metallic plate having a dished configuration as shown in FIG. 2, and having a rim 18.1 which rests upon the shelf 12.6 in abutting relation to the outer periphery 12.7 of the shelf. The rim 18.1 of the top may be rolled, as shown in FIG. 2, and the edges of the rim abut the shelf periphery 12.7 in a manner permitting the top to be snapped in and out of the body. The upper surface 12.8 of the body 12 may be provided with one or more shallow grooves 12.9 descending toward the rim and of a configuration permitting one to insert one's finger nail beneath the rim to aid in removal of the top for cleaning.

The dish-shaped configuration of the top 18 is such as to permit a cigarette to be rested thereon with the lit end of the cigarette resting upon the surface of the top and the other end of the cigarette projecting outwardly onto the rim 18.1. If desired, the top may project downwardly within the opening 12.1 more severely adjacent the rim 18.1, and the center portion of the top may be generally flat. Various other configurations of the top will be evident to those skilled in the art. The configuration of the top should be such that a lit cigarette can be easily and securely rested thereon without rolling or falling off. To this end, it may be desirable to provide the upper surface 12.8 with wire convolutions or inwardly directed grooves or the like to more securely support a cigarette, in a manner well known to those skilled in the art.

The metallic top may be made of a wide variety of metallic materials. The top may be made to appear shiny and silvery if desired, or may be made black or some other color to disguise to some extent the color of any tabacco tars or the like deposited on the top. In this respect, the top may be made of anodized aluminum with a blackened upper surface.

Figure 5:
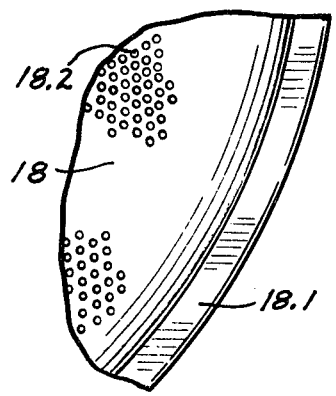
FIG. 5 is a broken away, greatly enlarged view of the top of the ashtray shown in FIGS. 1 and 2.

In one embodiment, which has given extremely good results, the top is made of stainless steel having a thickness of 0.010–0.013 inches and having an array of holes etched therein. Such holes are similar to the openings appearing in masks used in color television sets, and the manner of providing a sheet of metal with an array of etched holes is known. In the described embodiment, the holes may each have diameters in the range of about 0.016–0.018 inches, and may be arranged with respect to one another on approximately a 60° pattern, as shown best in FIG. 5, any three mutually adjacent holes forming the vertices of an equilateral triangle.

Figure 6:
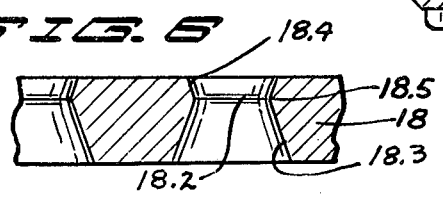
FIG. 6 is a greatly enlarged cross-sectional view of the top depicted also in FIG. 5.

In a given area of the top of the thus described embodiment, simple mathematics show that approximately 30% of the area of the top is made up of the holes with the remainder, or about 70%, being of metal. Etching of metal plates, as is known, can be accomplished by providing the metal plate with etchant-resistant material on both sides, the resistant material ("resist") being removed in those areas where etching away of the metal is desired. Etching may take place concurrently from both surfaces of the plate, or etching may occur predominantly from one surface and to a much lesser extent from the other surface. In FIG. 6, for example, the majority of the etching action has occurred at the bottom surface of the plate, providing upwardly converging walls 18.3 for each hole. The etching has proceeded to a much lesser extent from the top of the plate, and has produced downwardly converging walls 18.4 which merge into the upwardly convergent walls 18.3 at a point 18.5, which is the smallest diameter of the hole. It is desired to reduce the height of the walls 18.4, and to increase the height of the walls 18.3, so that the walls of the hole converge upwardly through at least a majority of the thickness of the plate, the point 18.5 being spaced much nearer the top surface than the bottom surface of the plate. Preferably, the walls 18.4 of the hole extend through only about 10% or less of the thickness of the plate.

It will be understood, of course, that the holes 18.2 need not be circular, but may be given other configurations such as slots, squares, ovals, and the like. In one embodiment, the top is made from a fine wire mesh, such as that which could correspond to a Tyler standard 32 mesh or smaller screen.

It is desired that the top 18 be of metal, such as stainless steel or brass, although other metals such as copper, bronze and aluminum can also be employed. The tops having etched holes in them, as described above, may be on the order of about 0.010 inches in thickness; a stainless steel top 0.013 inches in thickness has given good results, as has a brass top having a thickness of 0.010 inches. An exemplary diameter for a circular etched hole may be, for example, 0.016–0.018 inches.

The odor-treating material desirably does not only mask the odor of cigarette smoke, but actually removes at least a goodly amount of the odoriferous substance through absorption, adsorption or chemical reaction. Materials of this type are known to the art. The preferred odor-treating material is particulate activated charcoal having a bed depth and particle size distribution permitting airflow through the bed without great difficulty but yet providing a tortuous path for the air to follow to facilitate the removal of smoke odors. In general, it is desired that the charcoal bed depth, particle size and airflow rate be such that smoke laden air is contacted with the charcoal for at least about 1/25 seconds. In the embodiment shown in FIG. 2, the depth of the bed may be on the order of $\frac{1}{4}$–$\frac{1}{2}$ inch, and the particle size of the charcoal may range from, for example, about 1/16 of an inch to about $\frac{1}{4}$ of an inch, these dimensions being approximate average diameters of the particles.

The embodiment of FIG. 2 is depicted as having but a single layer of odor-treating material, but it will be understood that two or more abutting or spaced layers may be employed. For example, a layer of charcoal particles approximately $\frac{1}{4}$ inch in thickness may be supported above the fan, and another layer of particles may be supported below the fan for the additional purpose of muffling any fan noise. Charcoal used as the layer below the fan desirably has a particle size range of about 1/16–$\frac{1}{8}$ inch. The single charcoal bed 16 depicted in FIG. 2 may be made of two abutting layers of charcoal, the lower layer being about $\frac{1}{4}$ of an inch thick and having a particle size in the range of about 1/10–$\frac{1}{4}$ of an inch, and the upper layer being of similar thickness and having a particle size in the range of about 1/16–$\frac{1}{8}$ inch.

The lower screen 16.2 (FIG. 2) desirably has openings which are just small enough to retain the particulate charcoal or other odor-treating material thereon, but yet interfere as little as possible with the flow of air through the screen. The upper screen 16.1 may have larger openings if desired since the purpose of this screen is to maintain to some extent the configuration of the layer 16. Desirably, however, the screen 16.1 is substantially identical to screen 16.2, whereby particulate charcoal particles or the like forming the layer 16 are held securely between the screens and are prevented from escaping when the ashtray is accidentally dropped or is transported.

The body 12 of the ashtray may, of course, be of substantially any useful configuration, and is depicted in the drawing as being generally parallelepiped in shape. For reasons which will be more fully explained below, it is desired that the body have feet 12.2 which support the under surface 12.3 of the body upwardly slightly from the surface of a table or the like upon which the ashtray is rested. The body may be made of wood suitably finished to provide a pleasing external appearance, or may be made of plastic, glass, metal, or other material. In one embodiment, the body may be cast from Lucite or other transparent plastic so that the inner workings of the ashtray may be viewed with interest by an observer. In other embodiments, the body may be formed through ordinary molding techniques of colored or opaque plastic materials, and it will be understood from FIG. 2 that the generally vertical opening through the body of the ashtray may have slightly relieved interior walls to permit the body to be molded with ease. In FIG. 2, the switch 14.7 is shown in position in a small hole drilled toward the exterior of the body from the vertical opening; but the switch clearly may be positioned elsewhere in a convenient location at the exterior of the ashtray.

The diameter of the layer or layers of odor-treating material may be on the order of 5 inches in diameter, and the diameter of the opening at the bottom of the body in the vicinity of the fan blades may be approximately 3 inches in diameter.

The fan motor 14.2 is a fractional horsepower motor, and the fan blades 14.4 may be made from an appropriate disc of aluminum or the like which is attached at its center to the drive shaft of the motor. In one embodiment, the motor may be a Model 3M365 1/500 horsepower motor manufactured by the Dayton Electric Company, and having a speed of 3,000 revolutions per minute and a rated airflow of about 60 cubic feet per minute. The actual airflow through the ashtray, of course, is greatly reduced by the presence of the top 18 and layer or layers of odor-treating material 16.

Figure 3:
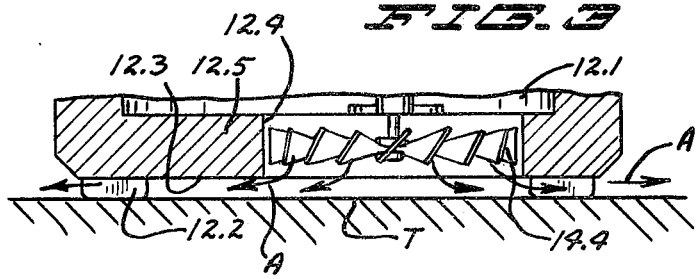
FIG. 3 is a broken away, partially schematic view in cross section of the ashtray of FIG. 1.
Figure 4:
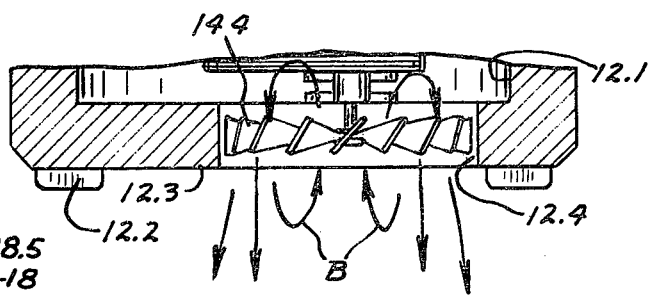
FIG. 4 is a view similar to that of FIG. 3 but showing the ashtray unsupported.

The feet 12.2 of the body, which may be of rubber or the like, space the body slightly above the surface upon which the ashtray is to be rested to provide escape paths for air drawn through the ashtray by the fan. Air propelled by the fan is thus forced generally radially outwardly between the body and table or other support, and escapes into the atmosphere about the lower edge of the body as shown in general by the arrows A in FIG. 3. Surprisingly, it has been found that when the depicted ashtray is lifted from a supporting surface so that the underside of the fan is freely exposed to the atmosphere, smoke may be seen to rise from a cigarette placed on the top 18, and little if any smoke is actually drawn through the ashtray. We are of the opinion that exhausted air is actually drawn back through the central portion of the fan blades, as indicated by the arrows B in FIG. 4 when the underside of the fan is freely exposed to the atmosphere in this manner. The thus-described reverse flow of air is prevented, however, when the underside of the ashtray and fan is closely spaced from a table top. The spacing of the ashtray above the top of a supporting surface by the feet 12.2 may be on the order of ¼ inch–⅜ inch or thereabouts, and can easily be determined and adjusted in actual practice. If desired, the thus-described fan and fan blades could be replaced with blowers andd the like, in which case the reverse airflow phenomenon thus described would be obviated. If desired, the feet 12.2 at the bottom of the body could be replaced with a supportive, open, lofty, supportive material such as the non-woven plastic matting sold under the trademark "Scotch-Brite" by the 3M Company.

An embodiment of the ashtray as depicted in the drawing has been operated for several hundred hours, and has been found to produce very little noise. The very faint hissing sound produced by rapid rotation of the fan blades 14.4 merges into the usual background noises in an office, and thus is completely unnoticed.

As described above, the various components of the ashtray of the invention are so selected and arranged as to draw smoke downwardly from a cigarette which is placed with its lit end substantially in contact with the top 18. When a cigarette is raised even a small distance from the top, smoke rises from the cigarette in the ordinary fashion. In this manner, the actual operation of the ashtray to draw smoke downwardly therethrough has surprisingly gone unnoticed by various users.

Thus, manifestly we have provided an ashtray which substantially removes the odor and also the noticeable particulate matter from cigarette smoke when a cigarette is rested on the ashtray top. The top of the ashtray substantially prevents the passage therethrough of cigarette ashes, and accordingly the ashtray can be as easily cleaned as can ashtrays of commonplace design.

While we have described a preferred embodiment of the present invention, it should be understood that various changes, adaptations, and modifications may be made therein without departing from the spirit of the inventions and the scope of the appended claims.

What is claimed is:

1. An ashtray for capturing and substantially eliminating odors of smoke from cigarettes or the like supported thereon, the ashtray comprising a body with an opening therethrough, lower means supported in the body for establishing a downwardly directed air flow through the body opening, a layer of odor treating material supported in the body opening in the path of the air flow, and a substantially horizontal metal top covering the opening upon which the burning end of a cigarette or the like may be rested, said top having a large plurality of small holes therethrough of a size and quantity sufficient to substantially prevent the passage of cigarette ashes through the top but to permit sufficient downward air flow through the body opening to entrain the smoke from a cigarette or the like resting on the top and to pass the smoke through the odor-treating material.

2. The ashtray of claim 1 wherein the top is a dished metal plate having etched perforations therethrough defining said holes, the perforations having walls divergent toward outer surfaces of the plate, and merging within the thickness of the plate at a point nearer the upper surface of the plate than the lower surface of the plate.

3. The ashtray of claim 1 in which the top comprises a solid, dished metal plate with perforations therethrough defining said holes.

4. The ashtray of claim 3 wherein the perforations have frusto-conically configured portions with downwardly divergent walls.

5. The ashtray of claim 4 in which the perforations in the top are sized and arranged so that, per unit area of the perforated top, the area occupied by perforations is at least about 20% of the unit area.

6. The ashtray of claim 1 in which the holes in the top are provided by wire mesh sized not greater than about Tyler standard 32 mesh.

7. An attractive, substantially silent ashtray for capturing and substantially eliminating odors of smoke from cigarettes or the like held thereon, the ashtray comprising a body with a generally vertical opening therethrough, a removable, substantially horizontal metal top covering the opening upon which the burning end of a cigarette or the like may be rested, the top having a plurality of small holes therethrough, substantially silently operating blower means for establishing a downwardly directed air flow through the top and body opening, and at least one layer of particulate, activated charcoal disposed within the opening in the path of the air flow for removing smoke odors therefrom, the blower means cooperating with a charcoal layer, body and top to produce a downward flow of air sufficient only to draw smoke downwardly from a cigarette or the like when the latter is placed with its lit end substantially resting on said ashtray top, the holes in the latter being of a size and quantity to substantially prevent the passage of cigarette ashes through the top but to permit sufficient downward air flow through the top to entrain smoke from a cigarette or the like resting thereon.

8. The ashtray of claim 7 wherein the top, blower means and at least one charcoal layer coact to provide a contact time of air-entrained smoke with the charcoal layer of at least about 1/25 seconds.

9. A substantially silently operating, easily cleaned ashtray for capturing and substantially eliminating odors of smoke from cigarettes or the like supported thereon, the ashtray comprising
   a. a body with a generally vertical opening therethrough;
   b. blower means mounted within the opening for establishing a downwardly directed airflow therethrough;
   c. at least one layer of particulate, activated charcoal supported within the body opening above the blower means and in the path of the downwardly directed airflow to adsorb smoke odors therefrom, and
   d. a substantially horizontal metal top covering the opening and comprising a dished metal plate having a large plurality of perforations etched therethrough, the perforations being of sufficiently small size to substantially prevent the passage of cigarette ashes through the top, and the perforations being of sufficient quantity and proximity to one another as to permit sufficient downward airflow therethrough to entrain smoke from a cigarette resting on the perforated plate and to pass the latter through the at least one charcoal layer.

10. An ashtray for capturing and substantially eliminating odors of smoke from cigarettes or the like supported thereon, the ashtray comprising a body with an opening therethrough, blower means carried by the body for establishing a downwardly directed air flow through the body opening, a layer of odor-treating material in the body opening in the path of the air flow, and a substantially horizontal metal top covering the opening and upon which the burning end of a cigarette or the like may be rested, said top having a large plurality of small holes therethrough ranging in diameter from about 0.016 inches to about 0.018 inches and permitting sufficient downward air flow through the body opening to entrain the smoke from a cigarette or the like resting on the top and to pass the smoke through the odor-treating material.

* * * * *